March 27, 1956  T. J. MORRIS  2,739,609
AUTOMATIC LIQUID FEED VALVE
Filed May 11, 1953
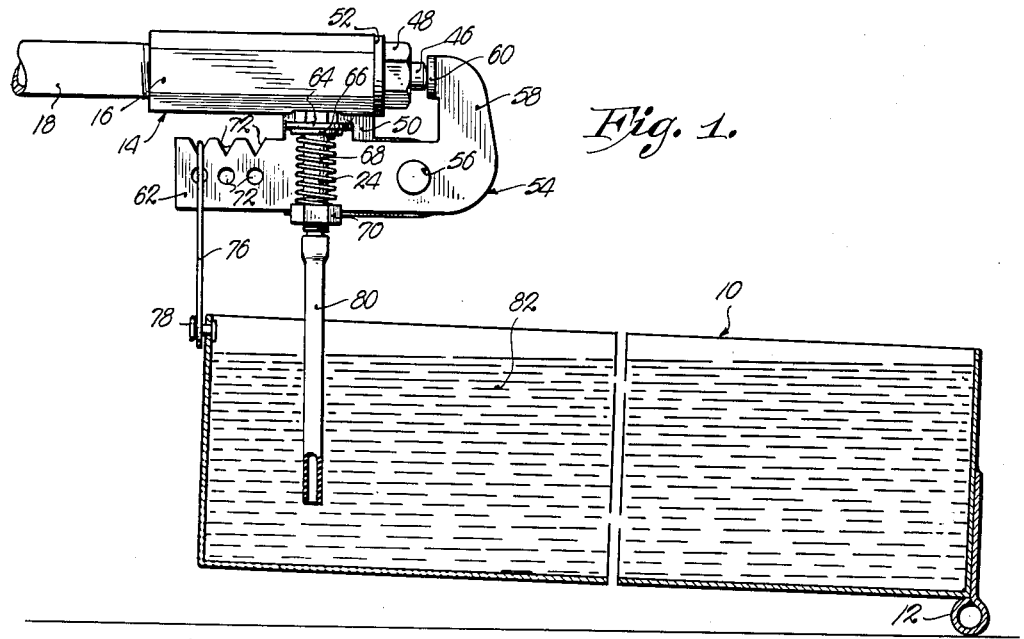
Fig. 1.
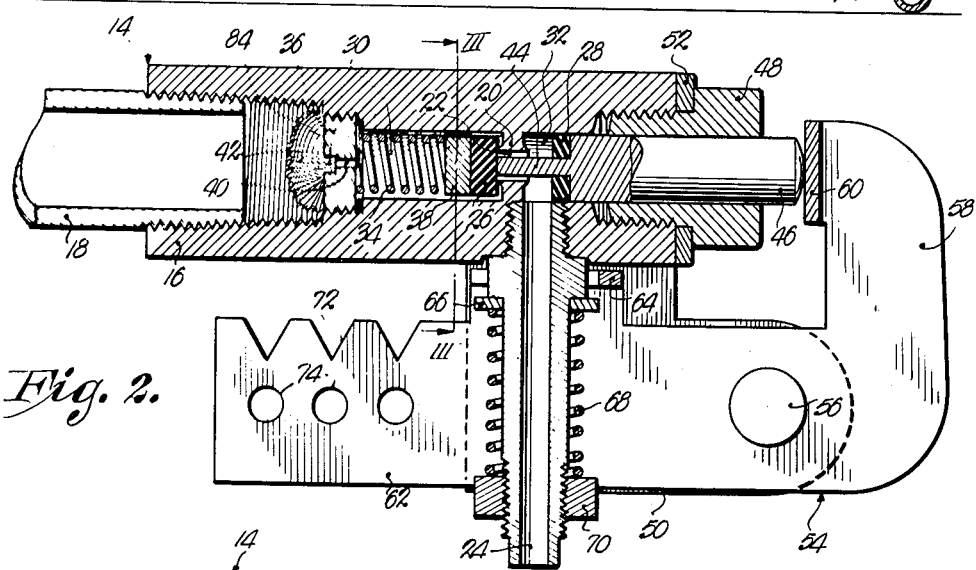
Fig. 2.
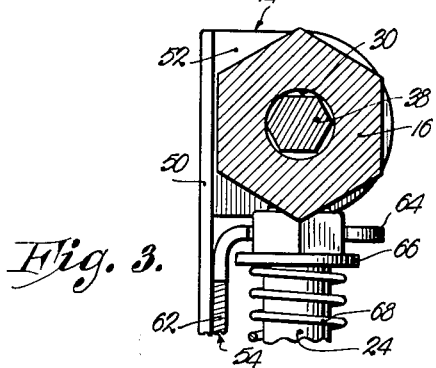
Fig. 3.
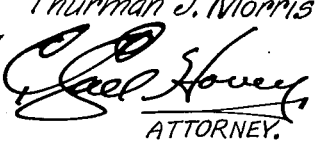
INVENTOR.
Thurman J. Morris
BY
ATTORNEY.

United States Patent Office 2,739,609
Patented Mar. 27, 1956

2,739,609

AUTOMATIC LIQUID FEED VALVE

Thurman J. Morris, Bentonville, Ark.

Application May 11, 1953, Serial No. 354,210

5 Claims. (Cl. 137—408)

This invention relates to a feeding valve for automatically maintaining a predetermined quantity of liquid in a receptacle as the liquid is progressively removed from the receptacle, the primary object being so provide a valve and receptacle assembly that is particularly adapted for facilitating watering of poultry.

It is the most important object of the present invention to provide liquid feeding structure for livestock, poultry and the like that includes an automatic shutoff valve operably coupled with a liquid-receiving pan and capable of opening to permit flow of liquid into the receptacle as the liquid is consumed and in direct response to reduction of weight on the valve by such removal of the liquid from the receptacle.

Another important object of the present invention is to provide liquid feeding structure wherein the liquid-receiving receptacle that is suspended from the valve assembly may be removed for cleaning or other purposes, whereupon the flow of liquid through the valve is blocked, notwithstanding the complete removal of the weight bias on the valve.

Another object of this invention is to provide a dual action valve assembly wherein a first spring-loaded valve is provided to block the passage of liquid through the valve body when the aforementioned receptacle is removed from the valve assembly, together with a second spring-loaded valve for blocking the passage of liquid through the valve body to the underlying receptacle when a predetermined level of liquid is reached in the receptacle.

Other objects include many important details of construction all of which will be made clear or become apparent as the following specification progresses, reference being had to the accompanying drawing wherein:

Figure 1 is a side elevational view of an automatic liquid feed valve made pursuant to the present invention showing the same operably coupled with an underlying receptacle, the latter being in section.

Fig. 2 is an enlarged, vertical, cross-sectional view through the valve hereof with the aforementioned receptacle entirely removed therefrom; and Fig. 3 is a fragmentary, detailed, vertical, transverse, cross-sectional view taken on line III—III of Fig. 2 looking in the direction of the arrows.

While the valve assembly hereof has been particularly designed for automatic feeding of water or other liquid to poultry, it will be appreciated, after an understanding thereof, that the same is adaptable for use wherever it is desired to maintain a predetermined level of liquid in a receptacle from which the liquid is progressively consumed.

There is shown therefore, in Fig. 1 of the drawing, an open top receptacle 10 in the nature of a relatively shallow pan that may be provided with a suitable foot 12 at one end thereof to permit freedom of swinging movement of the pan 10 for purposes hereinafter to be made clear.

The pan 10 is disposed in underlying relationship to a valve assembly broadly designated by the numeral 14 that includes a hollow body 16 coupled at one end thereof to a liquid inlet line 18. It is contemplated that the assembly 14 and one end of the receptacle 10 be supported solely by the line 18, but auxiliary support means may be provided if desired.

The body 16 is provided with a partition 20 intermediate the ends thereof having a perforation 22. The partition 20 is disposed between the inlet line 18 and an outlet tube 24 attached to the body 16 in depending relationship thereto and communicating therewith. A pair of valves 26 and 28 are mounted in the body 16 within chambers 30 and 32 respectively on opposite sides of the partition 20 for movement toward and away from the latter in seated relationship thereto and in closing relationship to the perforation 22.

The valve 26 within chamber 30 is held yieldably biased toward the partition 20 by a spring 34 within the chamber 30. Spring 34 is interposed between a plate 36 and a valve disc 38, the latter being interposed between the valve 26 and the spring 34. The plate 36 is provided with an orifice 40 and is removably mounted within the body 16 between the inlet line 18 and the spring 34. A strainer 42 is removably mounted in the body 16 between the line 18 and the plate 36.

The valve 28 within the chamber 32 is threaded upon an extension 44 of a reciprocable valve stem 46 extending into the chamber 32, the extension 44 projecting through the perforation 22 and engaging the valve 26. That end of the body 16 opposite to the inlet line 18 is closed by a removable sleeve 48 that provides a bearing for the valve stem 46 that reciprocates toward and away from the partition 20.

An L-shaped bracket 50 is removably mounted on the body 16 through the medium of a laterally extending perforated ear 52 forming an integral part thereof and clamped against that end of the body opposite to line 18 by the sleeve 48. The bracket 50 swingably mounts an L-shaped arm broadly designated by the numeral 54, through the medium of a pivot pin 56, one leg 58 of the arm 54 being provided with a laterally extending finger 60 engageable with the outermost end of the valve stem 46.

The other leg 62 of the arm 54 has a laterally extending slotted projection 64 that partially surrounds the outlet tube 24 above a washer 66 threaded on the tube 24. A spring 68 coiled about the tube 24 is interposed between the washer 66 and an adjusting nut 70 mounted on the tube 24.

Leg 62 of the arm 54 is provided with a plurality of notches 72 and a number of holes 74 adapted to receive the uppermost end of a bail 76 secured to that end of the pan 10 opposite to foot 12 by a pivot pin 78. It is noted that the pan 10 is suspended from the leg 62 when the bail 76 is looped into one of the notches 72 or one of the holes 74 in underlying relationship to the outlet tube 24. A conduit 80 on the tube 24 extends into liquid 82 within the pan 10.

In operation, when the line 18 is coupled with a suitable source of water or other liquid under pressure (not shown) and prior to attachment of the pan 10 to the leg 62 by use of the bail 76, spring 34 holds the valve 26 in the position shown in Fig. 2 of the drawing, pressed against the proximal face of the partition 20 in seated relationship thereto, thereby closing the perforation 22 and blocking the flow of liquid from the line 18 through the perforation 22, to the tube 24.

As soon as the pan 10 is connected to the leg 62 in the manner shown by Fig. 1 of the drawing, while the pan 10 is empty or having an insufficient amount of liquid 82 therein to overcome the action of spring 68, the inherent weight of the pan 10 will swing the arm 54 on the pivot pin 56 to thereby move the valve stem 46 toward the partition 20. The action of spring 34 will be overcome and valve 36 will move away from the partition 20 thereby permitting the flow of liquid from line 18, through perforation 22 and into the tube 24 for discharge through conduit 80 into the pan 10.

By virtue of the fact that the tube 24 is disposed between the partition 20 and the valve 28 when the valves 26 and 28 are disposed as shown in Fig. 2 of the drawing, such initial movement of the valve stem 46 to open the valve 26, will not cause valve 28 to close the perforation 22 and thereby prevent free flow of liquid through partiiton 22 and into the tube 24.

After a predetermined quantity of liquid 82 has been discharged into the pan 10, sufficient to overcome the action of spring 68, arm 54 will move stem 46 to a position where valve 28 engages the partition 20 and thereby closes the perforation 22.

It is to be noted that the washer 66 is spaced below the body 16 and that when pan 10 is initially coupled with the leg 62, projection 64 will descend into engagement with the washer 66. As the level of liquid 82 rises in the pan 10 to increase the weight on leg 62, spring 68 will yield to downward movement of the washer 66 on the tube 24, and the valve 28 will be gradually and progressively moved toward the partition 20 until the liquid flow is completely shut off. Manifestly, as the liquid 82 is consumed by the poultry, livestock or the like, spring 68 will operate to gradually raise the pan 10 on fulcrum 12, and since stem 46 is always biased against the finger 60 by spring 34, valve 28 will automatically open to replenish the supply of liquid 82 in the pan 10 and thereby maintain a predetermined level therein.

The height of the level of liquid 82 in the pan 10 may be predetermined by adjustment of the nut 70 and thereby varying the tension on spring 68. The rate and velocity of flow of the liquid from the line 18 to the receptacle 10, is governed by the size of the orifice 40 and therefore, such adjustment may be made by providing replacement plates 36 with differing sizes of orifices 40 therein.

It is noted that the arm 54 is disposed in underlying relationship to the body 16 and is, therefore, protected thereby and it is to be appreciated further, that through provision of the conduit 80 it is impossible for the poultry to interfere with the flow of liquid into the receptacle 10.

The entire valve assembly 14 is made from easily assembled parts which may likewise be quickly and easily disassembled for cleaning and/or repair as may become necessary. To this end, removal of the sleeve 48 and the tube 24 permits removal of the bracket 50 and the arm 54 attached thereto, whereupon the valve stem 46 and the valve 28 thereon, may be removed from the body 16. Body 16 may thereupon be removed from the line 18, the strainer 42 pulled from within the body 16 and the spring 34, disc 38 and valve 26, removed from within the chamber 30 by removing the plate 36 which is provided with a screwdriver slot 84 for such purpose.

Having thus described the invention what is claimed as new and desired to be secured by Letters Patent is:

1. In a valve assembly for automatically feeding liquid to an open top receptacle therebelow, an elongated body having a horizontal bore extending longitudinally therethrough and adapted for connection at one end thereof with a liquid inlet line for support thereby with the bore communicating with said line; a liquid outlet tube depending from the body intermediate the ends thereof and connected with the body in communication with said bore; a perforated partition in the bore between the outlet tube and said one end of the body; a first valve in the bore between the partition and said one end of the body; resilient means in the bore between said one end of the body and the first valve and engaging the latter to yieldably hold the first valve biased against the partition in closing relationship to the perforation of the latter; a stem extending into the bore at the opposite end of the body and reciprocable in the bore toward and away from said partition; a second valve in the bore and disposed between said opposite end of the body and the outlet tube when the stem is at the outermost end of its path of travel; an axial member on the innermost end of the stem, extending through the second valve and through said perforation into engagement with the first valve, and having a diameter appreciably smaller than the diameter of said perforation; an arm pivotally attached to the body therebelow for swinging movement on a horizontal axis, said arm having an upright stem-engaging leg and a horizontal leg adapted to suspend one end of said receptacle when the latter is beneath said tube, whereby the weight of the latter swings the arm and shifts the stem inwardly to open the first valve; and means on the tube and engageable with said horizontal leg for restraining the latter to hold the second valve open when the receptacle is empty, said restraining means being yieldable whereby as the receptacle fills with liquid the second valve will be shifted into engagement with the partition, closing said partition.

2. In a valve assembly as set forth in claim 1 wherein said body is provided with a sleeve disposed to serve as a bearing for the stem and wherein is provided a bracket secured to the body by the sleeve, said bracket providing the pivotal attachment for the arm to the body.

3. In a valve assembly as set forth in claim 1 wherein is provided a plug in the bore adjacent said one end of the body and having an orifice, said resilient means constituting a coil spring in the bore between the plug and said first valve.

4. In a valve assembly as set forth in claim 1 wherein said tube is provided with a stop and said horizontal leg is provided with a lateral, slotted projection embracing the tube, said restraining means constituting a spring coiled about the tube between the stop and the projection.

5. In a valve assembly as set forth in claim 4 wherein said tube is externally threaded and said stop constitutes a nut on the tube for adjusting the tension of said spring.

References Cited in the file of this patent

UNITED STATES PATENTS

| | | |
|---|---|---|
| Re. 23,447 | Pruitt | Dec. 25, 1951 |
| 1,753,122 | Kielsmeier | Apr. 1, 1938 |
| 2,601,166 | Myers | June 17, 1952 |
| 2,629,397 | Toadvine | Feb. 24, 1953 |